Figure 1:
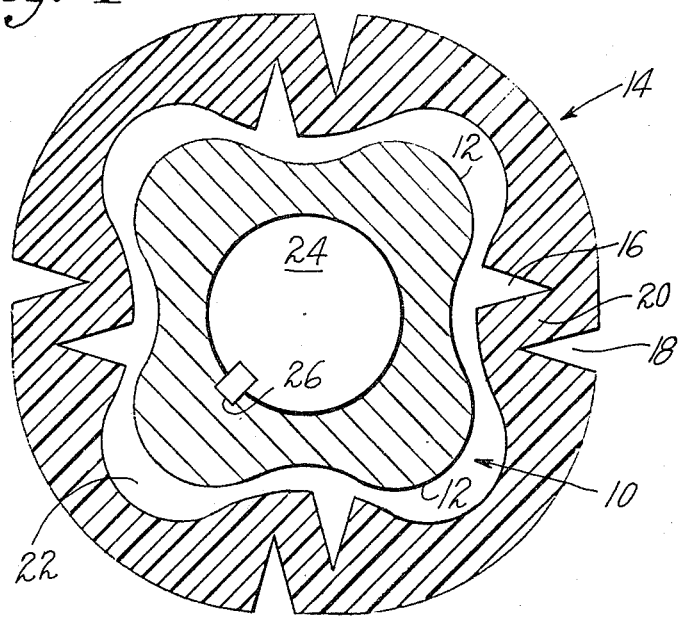

United States Patent [19]
Bassett

[11] 3,918,652
[45] Nov. 11, 1975

[54] CORE CHUCKS

[76] Inventor: Kirk W. Bassett, 9 Knollwood Road, Paxton, Mass. 01612

[22] Filed: May 20, 1974

[21] Appl. No.: 471,301

Related U.S. Application Data

[63] Continuation-in-part of Ser. No. 185,714, Oct. 1, 1971, Pat. No. 3,811,632.

[52] U.S. Cl. .................... 242/46.4; 242/72; 279/2
[51] Int. Cl. ..................... B65h 17/02; B65h 75/30
[58] Field of Search ....... 242/68.1, 68.2, 68.3, 68.4, 242/72, 46.4; 279/1 R, 2; 64/27 NM, 30 R

[56] References Cited
UNITED STATES PATENTS

| | | | |
|---|---|---|---|
| 3,355,121 | 11/1967 | Wright | 242/68.2 |
| 3,593,933 | 7/1971 | Groshurn | 242/46.4 |
| 3,811,632 | 5/1974 | Bassett | 242/46.4 |

Primary Examiner—Edward J. McCarthy
Attorney, Agent, or Firm—Maurice R. Boiteau

[57] ABSTRACT

There is disclosed in the present application a core chuck comprising a relatively rigid and non-deformable multi-lobar actuator loosely surrounded by an elastomeric sleeve which in its free state is non-circular in cross-section and circumferentially contractible to accommodate to the interior of a paper roll core which is of a diameter smaller than the dimension of the sleeve in its free state.

5 Claims, 2 Drawing Figures

CORE CHUCKS

This application is a continuation-in-part of my co-pending application for U.S. Pat. Ser. No. 185,714 filed Oct. 1, 1971, U.S. Pat. No. 3,811,632.

The present invention relates generally to core chucks and more particularly to chucks in which coupling is obtained to the interior of a web roll core by means of a deformable elastomeric sleeve.

In my prior application, there is disclosed a core chuck including a rigid multi-lobar actuator of a non-circular sleeve including a plurality of generally equally spaced core engaging ridges and relieved flanks. The sleeve is formed to provide voids in line radially with the ridges so that the size of the sleeve may be contracted for entry into the core. It has been found, however, that although the core chuck of the prior application is satisfactory when the size of the sleeve is accurately matched to the interior of the roll core and other factors are carefully controlled, highly damaging slippage may occur if variables are introduced into the coupling conditions. Thus, the grip on the interior of the core may be insufficient if there is an insufficient contracting margin in the size of the sleeve, or the sleeve is either harder or softer than necessary if its surface becomes slippery for some reason.

It is accordingly an object of the present invention to provide a core chuck of simple construction yet adapted to provide slip-free coupling to a heavy web roll under high torque conditions.

Another object is to provide a core chuck which is both economical to manufacture and highly durable in use.

The foregoing objects are achieved according to the present invention by a core chuck including a relatively rigid multi-lobar metal actuator loosely surrounded by a flexible sleeve. According to a feature of the invention, the sleeve which is non-cylindrical in its free state is formed with generally equally spaced circumferentially contractible areas located to coincide with the interval between the lobes on the actuator when the two parts are assembled. As the sleeve is circumferentially contracted, its interior fits more closely by the contour of the actuator and any torque thereafter applied to the actuator while the sleeve is in engagement with the interior of the core, causes expansion of the sleeve to grip the core more tightly.

Figure 2:
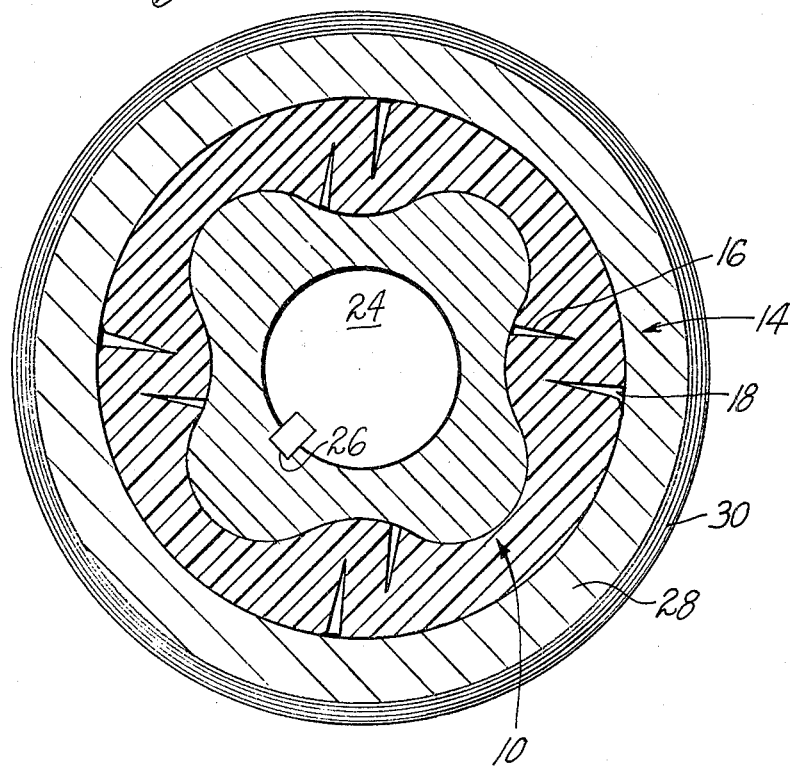

The foregoing objects and features of the present invention will be more fully understood from a detailed description of an illustrative embodiment taken in connection with the accompanying drawings in which:

FIG. 1 is a view in cross-section of a core chuck according to the present invention including an actuator surrounded by an elastomeric sleeve as shown in its free state; and FIG. 2 is a view in cross-section of the core chuck of FIG. 1 but shown inserted inside the core of a web roll.

Turning now to the drawings, there is shown in FIG. 1 a multi-lobar actuator indicated generally at 10, which is formed of metal and includes four rounded, radially projecting lobes 12. For all practical purposes, the actuator 10 may be regarded as rigid since coupling to a web roll is accomplished by means of a flexible sleeve of elastomeric material indicated generally at 14. The number of lobes should be no fewer than three, although two are theoretically possible, and may be substantially more depending upon the size of the core to be engaged. The interior contour of the sleeve 14 in its free state is generally parallel to that of the actuator 10 but large enough to leave a gap of approximately an eighth inch measured in a radial direction between the actuator and the sleeve. In general, both the actuator 10 and the sleeve 14 are of uniform cross-section throughout their lengths although the sleeve may be chamfered at its ends to facilitate its insertion into the roll core. In order to permit the sleeve 14 to be contracted more closely to fit the actuator 10, it is formed with circumferentially contractible zones located in the sleeve approximately midway between lobes on the actuator. Each of the zones which essentially provides an accordion fold, preferably consists of an inner notch 16 and an outer notch 18 defining between them a bar 20. The contractible zone is formed in what would otherwise be the thickest and consequently the stiffest portion of the sleeve but in fact provides an area which contracts circumferentially to permit insertion of the larger sleeve into a smaller roll core. As shown in FIGS. 1 and 2, the actuator 10 is supported on a shaft 24 to which it is retained against rotation by a key 26. The length of the chuck is variable to accommodate different web roll sizes but is generally between four and eight inches. As in the case of the prior core chuck, two chucks may be separately flange mounted directly in a machine or alternatively mounted on a common arbor.

As seen in FIG. 2, the chuck assembly has been inserted into a core 28 of a web roll 30. In order to compress the sleeve for entry into the core, the contractible zones are considerably shortened as the notches 16 and 18 close substantially and the bar 20 from an oblique orientation depicted in FIG. 1 assumes a more nearly radial direction depicted in FIG. 2.

In the condition of FIG. 2, before any torque is applied to the shaft 24, the sleeve 14 having been deformed for insertion reacts with some degree of force against the interior of the core as the sleeve tends to expand from its compressed condition. When torque is thereafter applied to the shaft 24 in either direction, the actuator 10 tends to turn relative to the sleeve 14 and thereby causes expansion of the sleeve into much more forceful engagement with the interior of the core. The coupling thereby obtained between the core 28 and the shaft 24 is adapted to the transmission of very high torque loads as the roll which may be several feet in diameter is either accelerated or decelerated through the shaft.

The sleeve herein illustrated and described includes generally N-shaped contractible zones but other shapes are available particularly if a greater degree of contraction is desired. Thus, for example, a similar accordion fold effect is obtainable with a M-shaped zone formed either by two exterior notches and one interior notch or two interior notches and one exterior notch. Excellent results have been obtained employing sleeves of epoxy resin having durometer hardnesses of A60 to A95, the hardness generally being proportional to the size and weight of the related web roll. The sleeve may alternatively be molded of natural or synthetic rubbers. The number of lobes may be varied in acccordance with the core size and sleeve compression requirements to include in addition to four, as few as three, or as many as five, six or more.

Having thus disclosed my invention, what I claim as new and desire to secure by Letters Patent of the United States is:

1. A core chuck assembly having an axis adapted for co-axial coupling to a web roll supported on a core comprising a relatively rigid actuator formed with a plurality of radially extending equally spaced lobes and a flexible sleeve of elastomeric material loosely surrounding the actuator, the sleeve including a plurality of circumferentially compressible zones angularly interposed about the axis generally centrally between the lobes on the actuator, each zone having at least two generally radial slots defining the zone.

2. A core chuck assembly according to claim 1 further characterized in that the actuator and sleeve are of generally uniform cross-section throughout their lengths and the number of compressible zones is equal to that of the lobes on the actuator.

3. A core chuck assembly having an axis adapted for coaxial coupling to a web roll supported on a core comprising a relatively rigid actuator formed with a plurality of radially extending equally spaced lobes and a flexible sleeve of elastomeric material loosely surrounding the actuator, the sleeve including a plurality of circumferentially compressible zones angularly interposed about the axis generally centrally between the lobes on the actuator, each compressible zone on the sleeve including an accordion fold which is reduced in circumferential extent as the sleeve is compressed to enter the core.

4. A core chuck according to claim 3 further characterized in that the accordion fold includes an external notch and an internal notch together defining a tiltable bar.

5. A core chuck according to claim 4 further characterized in that the actuator is formed with four equally spaced lobes and that each accordion fold is formed in a thick part of the cross-section of the sleeve between the lobes on the actuator.

* * * * *